United States Patent
Makino

(10) Patent No.: US 11,325,582 B2
(45) Date of Patent: May 10, 2022

(54) VEHICLE CONTROL APPARATUS

(71) Applicant: SUBARU CORPORATION, Tokyo (JP)

(72) Inventor: Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 308 days.

(21) Appl. No.: 16/590,969

(22) Filed: Oct. 2, 2019

(65) Prior Publication Data

US 2020/0164861 A1 May 28, 2020

(30) Foreign Application Priority Data

Nov. 28, 2018 (JP) .............................. JP2018-222182

(51) Int. Cl.
*B60W 20/14* (2016.01)
*B60L 7/18* (2006.01)

(52) U.S. Cl.
CPC .............. *B60W 20/14* (2016.01); *B60L 7/18* (2013.01); *B60L 2240/14* (2013.01); *B60L 2260/20* (2013.01); *B60W 2530/00* (2013.01); *B60W 2540/10* (2013.01)

(58) Field of Classification Search
CPC ............. B60W 20/14; B60W 2530/00; B60W 2540/10; B60L 7/18; B60L 2240/14; B60L 2260/20
See application file for complete search history.

(56) References Cited

U.S. PATENT DOCUMENTS 5,915,801 A 6/1999 Taga et al.
2018/0043896 A1* 2/2018 Lee .................. B60W 30/18127

FOREIGN PATENT DOCUMENTS

JP 09-037407 A 2/1997

* cited by examiner

*Primary Examiner* — Russell Frejd
*Assistant Examiner* — Anthony M Gartrelle
(74) *Attorney, Agent, or Firm* — McDermott Will & Emery LLP

(57) ABSTRACT

A vehicle control apparatus includes a determination processor and a regeneration controller. During traveling in a first travel mode, the determination processor determines a timing at which a regenerative braking force based on a motor regenerative force is to be increased under the condition that an accelerator-off operation period is equal to or less than a predetermined period. During traveling in a second travel mode, the determination processor refrains from determining the timing at which the regenerative braking force is to be increased under the sole condition that the accelerator-off operation period is equal to or less than the predetermined period. The regeneration controller performs control that increases the motor regenerative force as the determination processor determines the timing at which the regenerative braking force is to be increased.

16 Claims, 7 Drawing Sheets

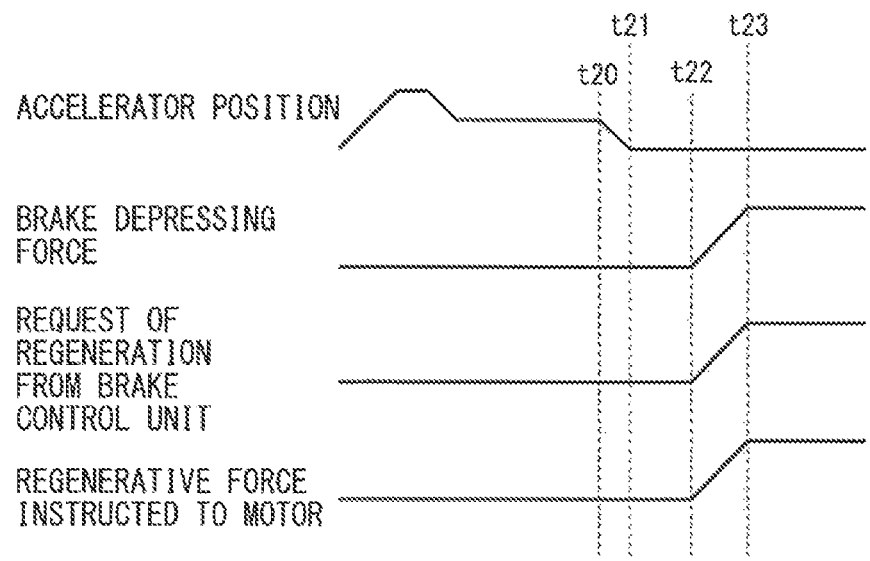
FIG. 6A
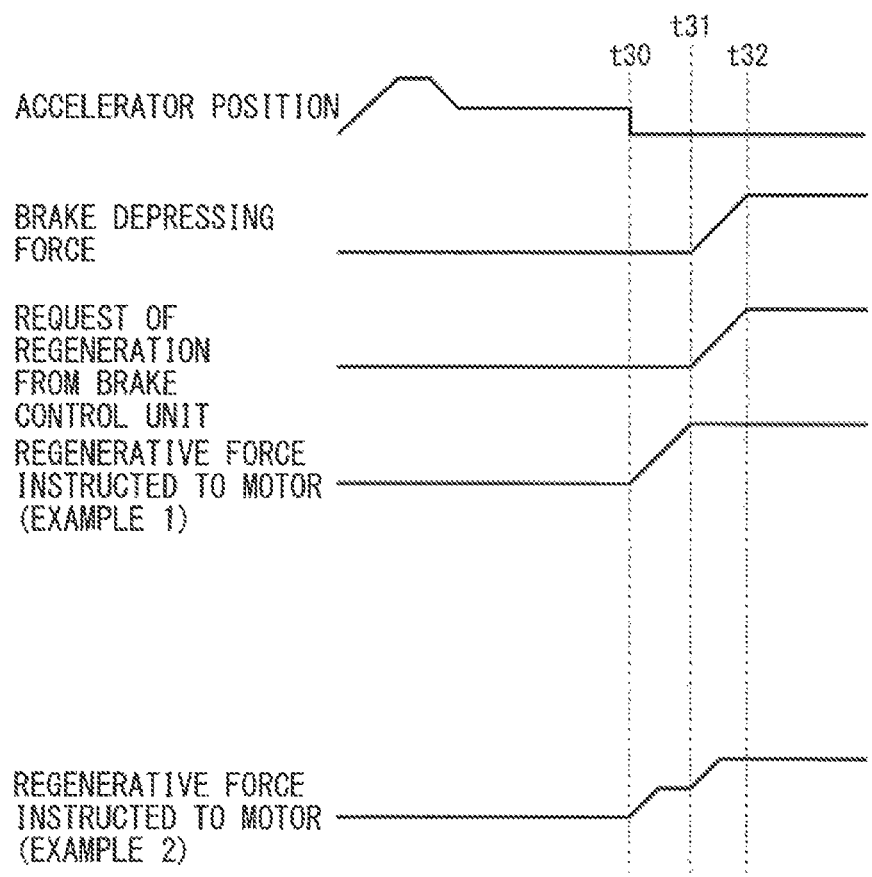
FIG. 6B
FIG. 6C

VEHICLE CONTROL APPARATUS

CROSS-REFERENCE TO RELATED APPLICATIONS

The present application claims priority from Japanese Patent Application No. 2018-222182 filed on Nov. 28, 2018, the entire contents of which are hereby incorporated by reference.

BACKGROUND

The technology relates to a vehicle control apparatus that controls a braking force based on regeneration.

In vehicles including hybrid electric vehicles and electric vehicles, regenerative braking based on a motor regenerative force has been used as a principal braking force. When a driver has depressed a brake pedal, for example, a braking force based on motor regeneration and a braking force based on brake pads are generated together.

Note that Japanese Unexamined Patent Application Publication No. H09-037407 discloses that, in a case where an accelerator pedal is released or an accelerator position is lowered at a greater speed, i.e., when the driver performs an accelerator-off operation quickly, a greater regenerative braking force is generated before the brake pedal is depressed.

SUMMARY

An aspect of the technology provides a vehicle control apparatus including a determination processor and a regeneration controller. During traveling in a first travel mode, the determination processor is configured to determine a timing at which a regenerative braking force based on a motor regenerative force is to be increased under a condition that an accelerator-off operation period is equal to or less than a predetermined period. During traveling in a second travel mode, the determination processor is configured to refrain from determining the timing at which the regenerative braking force is to be increased under the sole condition that the accelerator-off operation period is equal to or less than the predetermined period. The regeneration controller is configured to perform control that increases the motor regenerative force as the determination processor determines the timing at which the regenerative braking force is to be increased.

An aspect of the technology provides a vehicle control apparatus including circuitry. The circuitry is configured to perform a determination process that determines, during traveling in a first travel mode, a timing at which a regenerative braking force based on a motor regenerative force is to be increased under a condition that an accelerator-off operation period is equal to or less than a predetermined period, and refrains from determining, during traveling in a second travel mode, the timing at which the regenerative braking force is to be increased under the sole condition that the accelerator-off operation period is equal to or less than the predetermined period. The circuitry is configured to perform control that increases the motor regenerative force as the determination process determines the timing at which the regenerative braking force is to be increased.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIGS. 6A, 6B and 6C illustrates an example of the regeneration instruction in response to accelerator-off operation according to the example embodiment.

DETAILED DESCRIPTION

Figure 1:
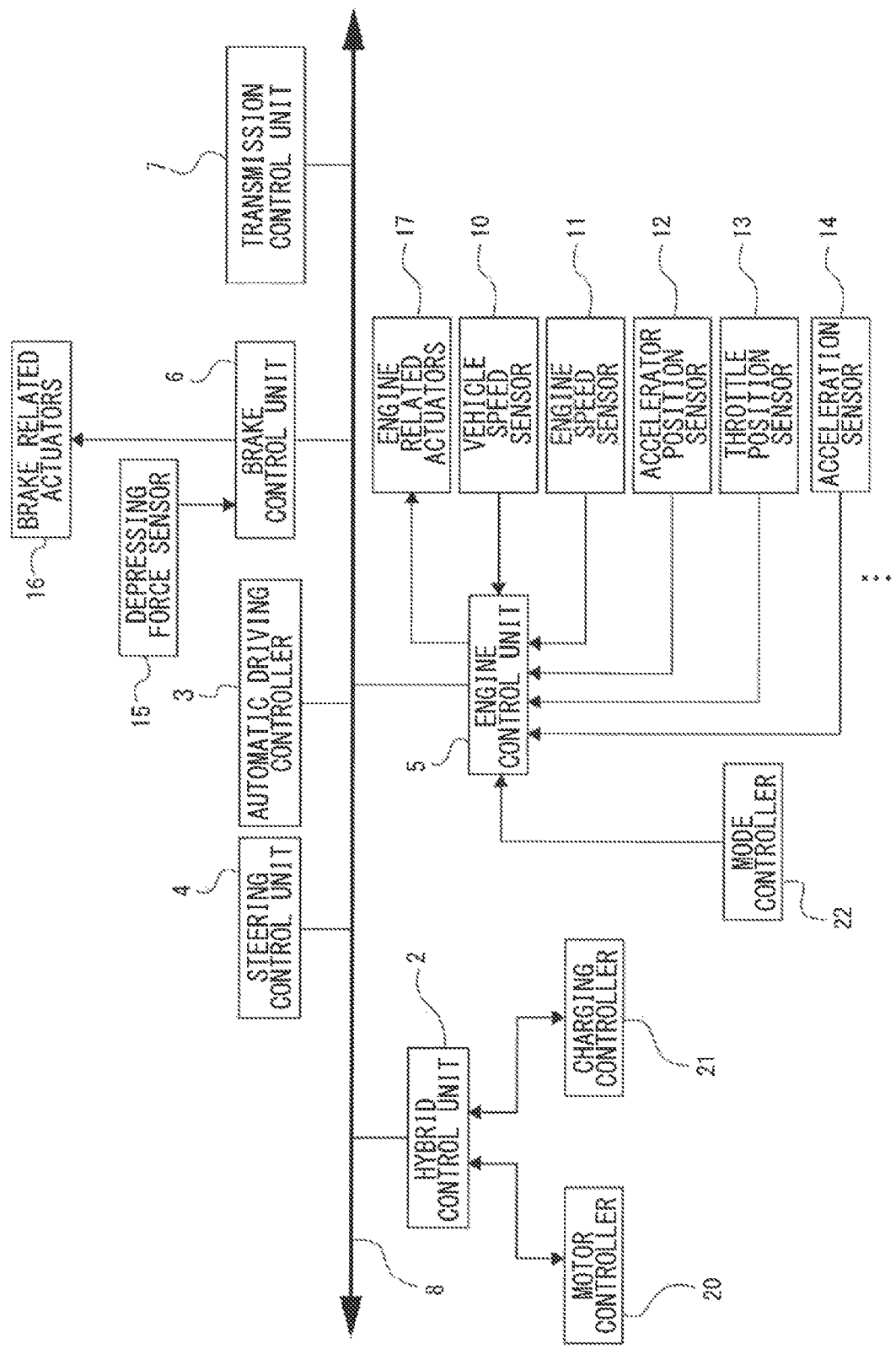
FIG. 1 is a block diagram illustrating an example of a vehicle control system including a vehicle control apparatus according to one example embodiment of the technology.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

When an accelerator is released while an accelerator-on state where the accelerator pedal is depressed for traveling at a certain vehicle speed, a deceleration force based on engine braking or regenerative braking occurs. When a brake pedal is then depressed at this time, a further deceleration force based on regenerative braking or brake pads occurs.

Such a flow from the accelerator-on operation to the accelerator-off operation and then to the brake-on operation is often seen in normal traveling. However, a strong deceleration force may have to be generated as soon as possible depending on situations, such as a situation where there is a pedestrian or an obstruction ahead of a vehicle. Considering such a situation, allowing a regenerative braking force to occur in accordance with the accelerator-off operation before the brake pedal is depressed is regarded as one of advantageous brake control methods.

However, there is a case where a driver performs acceleration works or on/off operations on the accelerator pedal frequently and quickly for sporty driving. In such a case, strong braking can occur when the accelerator pedal is simply released. Such braking can be unintentional braking for the driver and make the driver feel uncomfortable with degraded drivability.

It is desirable to achieve regenerative brake control in a state appropriate for accelerator operations of a driver for traveling.

Configuration of Vehicle Control System

FIG. 1 illustrates main parts of a vehicle control system 1 mounted on a vehicle. In one example embodiment, the vehicle may be a hybrid electric vehicle.

Now described is an example embodiment of the technology where a hybrid control unit 2 may serve as a "vehicle control apparatus", for example.

Note that the description where the vehicle represents the hybrid electric vehicle is merely an example. It is assumed that the vehicle control apparatus according to the example of the technology may be mounted on another vehicle such as an electric vehicle.

Note that the description in this example embodiment that the hybrid control unit 2 represents the vehicle control apparatus is also a mere example. In another example embodiment of the technology, one of other control units, which is illustrated or not illustrated, may be serve as the vehicle control apparatus.

The vehicle control system 1 may be communicably coupled each other with the hybrid control unit 2, a steering control unit 4, an engine control unit 5, a brake control unit 6, and a transmission control unit 7 via a bus 8.

For example, the hybrid control unit 2, the steering control unit 4, the engine control unit 5, the brake control unit 6, and the transmission control unit 7 may each include a microcomputer including a central process unit (CPU), a read only memory (ROM), a random access memory (RAM), and a non-volatile memory, for example. This allows the units to perform data communications with each other via a bus 8 through a communication protocol conforming to a controller area network (CAN) or a local interconnect network (LIN), for example.

The steering control unit 4 may control driving of a steering actuator, such as a non-illustrated power steering motor, that is able to change a steering angle. The steering control unit 4 may thereby control a steering angle.

On the basis of signals detected by predetermined sensors provided on the vehicle and data on operations entered through operation elements, for example, the engine control unit 5 may control various kinds of actuators. In one example embodiment, the various kinds of actuators may include engine related actuators 17. Non-limiting examples of the engine related actuators may include a throttle actuator that drives a throttle valve of an injector that injects fuel, and other various kinds of actuators pertaining to driving of the engine.

The engine control unit 5 may control starting or stopping of the engine in accordance to operations of predetermined operation elements including an ignition switch provided in a vehicle 100 or instructions sent from an automatic driving controller 3, for example.

The engine control unit 5 may be coupled with various kinds of engine-control related sensors. Non-limiting examples of the sensors may include a vehicle speed sensor 10 that detects, as a vehicle speed, a travel speed of the vehicle, an engine speed sensor 11 that detects a speed of the engine, an accelerator position sensor 12 that detects, as an accelerator position, a depressed amount of an accelerator pedal, a throttle position sensor 13 that detects, as a throttle position, a position of a throttle valve, and an acceleration sensor 14 that detects acceleration of the vehicle. To cause the engine to run, the engine control unit 5 may use values detected by the sensors.

The engine control unit 5 may send, as necessary, the values detected by the various kinds of the sensors described above to predetermined control units such as the hybrid control unit 2, via the bus 8.

The engine control unit 5 may receive data on how a mode manipulator 22 is operated. In one example embodiment, the mode manipulator 22 may include an operation element that may be used by a driver to designate a travel mode. Data on how the mode manipulator 22 is operated may be supplied directly or indirectly via a non-illustrated operation detection unit, for example, to the engine control unit 5.

As the travel mode, either a normal mode or a sport mode may be selected.

The normal mode may denote a travel mode appropriately for traveling with less fuel consumption, for example. The sport mode may denote a travel mode appropriately for a higher driving ability, i.e., higher drivability for sport driving, for example. The engine control unit 5 may perform control that differentiates, between the normal mode and the sport mode, acceleration response with respect to an accelerator pedal operation, for example. That is, acceleration in the sport mode may become greater than acceleration in the normal mode even at an identical accelerator position.

In one embodiment of the technology, the normal mode may serve as a "first travel mode", and the sport mode may serve as a "second travel mode".

Note that data on the travel mode may be sent from the engine control unit 5 or a non-illustrated operation detection unit via the bus 8 to the hybrid control unit 2, for example.

On the basis of signals detected by predetermined sensors provided on the vehicle and data on the operations entered through operation elements, for example, the brake control unit 6 may control various kinds of actuators. In one example embodiment, the various kinds of actuators may include brake related actuators 16. Non-limiting examples of the brake related actuators may include a fluid pressure control actuator that controls pressure of fluid output from a brake booster to a master cylinder, a fluid pressure control actuator that controls pressure of the fluid in brake fluid piping, and other various kinds of brake related actuators.

The brake control unit 6 may use data detected by predetermined sensors, such as axle shaft rotational speed sensors and the vehicle speed sensor to calculate slip ratios of wheels. The brake control unit 6 may cause the fluid pressure control actuators to increase or decrease fluid pressure in accordance with the slip ratios. The brake control unit 6 may thus perform an antilock brake system (ABS) control. On the basis of an instruction from the automatic driving controller 3, the brake control unit 6 may control the fluid pressure control actuators described above to perform control for brake ON/OFF, for example.

The brake control unit 6 may receive data on a value of a depressing force detected by a depressing force sensor 15 that detects how much depressing force is exerted on a brake pedal. Upon detection of a brake pedal operation, the brake control unit 6 may send a request for regeneration via the bus 8 to the hybrid control unit 2 to cause the regenerative brake control to take place.

On the basis of signals detected by predetermined sensors provided on the vehicle and data on operations entered through operation elements, for example, the transmission control unit 7 may control various kinds of actuators. In one example embodiment, the various kinds of actuators may include transmission related actuators that are not illustrated. Non-limiting examples of the transmission related actuators may include a gear shift actuator that performs gear shift control for an automatic transmission provided on the vehicle, and a forward and backward switching actuator that controls how a forward and backward switching mechanism is operated, for example.

On the basis of operations entered by the driver and values representing vehicle data on an accelerator position received from the engine control unit 5, for example, the hybrid control unit 2 may send instructions to the engine control unit 5, a motor controller 20, and a charging controller 21 to control how the vehicle behaves.

On the basis of instructions sent from the hybrid control unit 2, the motor controller 20 may control driving of a travel motor generator in the vehicle.

On the basis of instructions sent from the hybrid control unit 2, the charging controller 21 may control charging of a travel battery in the vehicle. In one example embodiment, the travel battery may serve as a power supply for the motor generator described above. In the example embodiment, the charging controller 21 may perform control that charges the travel battery on the basis of power generated as the motor generator rotates for regenerative braking.

On the basis of an accelerator position value received from the engine control unit 5, the hybrid control unit 2 may calculate required torque T, i.e., torque that has to be output to the wheels, in accordance with an amount of an accelerator operation by the driver. The hybrid control unit 2 may cause the engine control unit 5 and the motor controller 20 to execute operation control for the engine and the motor generator, thereby allowing the vehicle to travel with a required driving force corresponding to the required torque T. On the basis of a state of charge (SOC) or a charging ratio of the travel battery, the hybrid control unit 2 may further cause the charging controller 21 to execute control that charges the travel battery.

Depending on a vehicle state, the hybrid control unit 2 may switch between electric vehicle (EV) traveling and hybrid traveling. During the EV traveling, the hybrid control unit 2 may calculate torque required for the motor generator on the basis of the required torque T calculated on the basis of an accelerator position value. Hereinafter, the torque is referred to as "required torque Tb". The hybrid control unit 2 may then provide the motor controller 20 with the required torque Tb to control how the motor generator operates.

During the hybrid traveling, the hybrid control unit 2 may calculate torque required for the engine on the basis of the required torque T, as well as the required torque Tb required for the motor generator. Hereinafter, the torque required for the engine is referred to as "required torque Te". The hybrid control unit 2 may then instruct the engine control unit 5 to provide the required torque Te. The hybrid control unit 2 may further provide the motor controller 20 with the required torque Tb. The hybrid control unit 2 may thus control how the engine and the motor generator operate.

The hybrid control unit 2 may provide an instruction regarding regenerative braking to the motor controller 20. The motor controller 20 may be thereby caused to execute braking using a regenerative force that occurs in the motor generator.

The hybrid control unit 2 may receive a request for regeneration in accordance with a brake pedal operation from the brake control unit 6. The hybrid control unit 2 may further receive values of an accelerator position and acceleration from the engine control unit 5. Upon reception of the request for regeneration from the brake control unit 6, the hybrid control unit 2 may provide a regeneration instruction to the motor controller 20 to execute regenerative braking. In one example embodiment, the provision of a regeneration instruction may correspond to brake control.

The hybrid control unit 2 may instruct the motor controller 20 to execute normal regenerative braking also when an accelerator-off operation is detected. Note that the term "accelerator-off operation" may denote an operation that the driver releases the accelerator pedal or lowers an accelerator position.

In accordance with a period of the accelerator-off operation, for example, the hybrid control unit 2 may temporarily increase a braking force based on regenerative braking in some cases. For purpose of description, such a control is hereinafter referred to as a "regeneration temporary increase control", which will be described later.

Configuration of Hybrid Control Unit 2

In the vehicle control system 1 described above, the hybrid control unit 2 may perform control pertaining to regenerative braking of the motor generator. To execute the regeneration temporary increase control described above, the hybrid control unit 2 may have such a configuration as illustrated in FIG. 2, for example.

Figure 2:
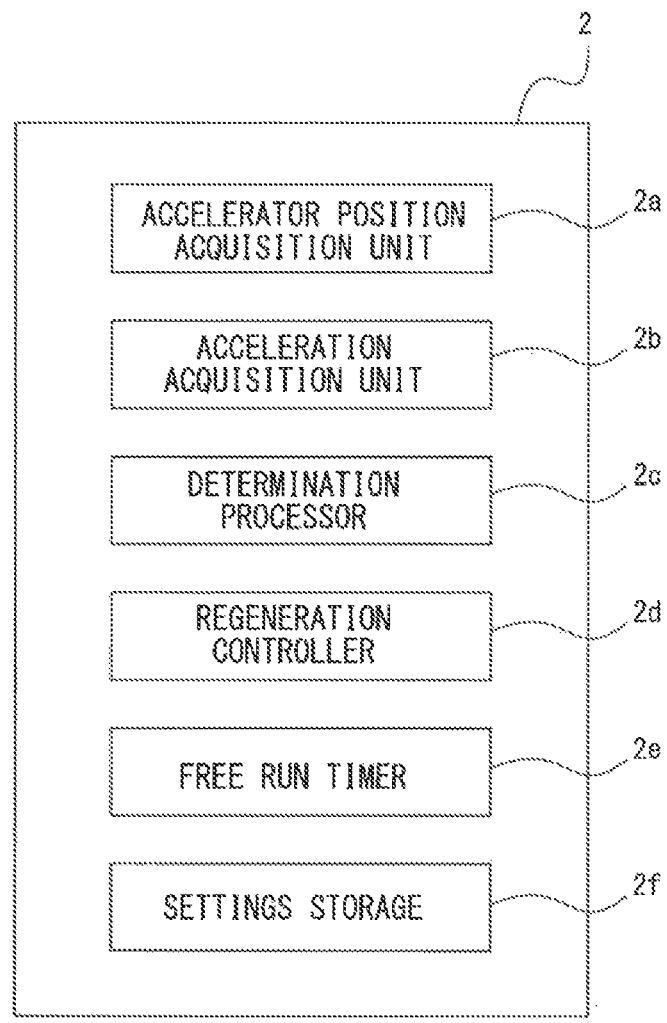
FIG. 2 illustrates an example of a configuration of a hybrid control unit representing the vehicle control apparatus according to the example embodiment.

As illustrated in FIG. 2, the hybrid control unit 2 implemented as a microcomputer may be provided with components implemented as software. Non-limiting examples of the components may include an accelerator position acquisition unit 2a, an acceleration acquisition unit 2b, a determination processor 2c, a regeneration controller 2d, a free run timer 2e, and a settings storage 2f.

The accelerator position acquisition unit 2a may successively receive data on an accelerator position or an accelerator position value sent from the engine control unit 5.

The acceleration acquisition unit 2b may as well successively receive data on acceleration or a current acceleration value that is detected by the acceleration sensor 14 and sent from the engine control unit 5. Note that, in a case where an acceleration sensor is provided in the hybrid control unit 2, the acceleration acquisition unit 2b may acquire a value detected by the acceleration sensor.

Upon detection of the accelerator-off operation based on the acquired accelerator position value, the determination processor 2c may determine whether it is a timing at which the regeneration temporary increase control that increases a regenerative braking force is executed. Such a determination process may take place as follows: In a case where the travel mode is designated to the normal mode, for example, the determination processor 2c may determine a timing at which a regenerative braking force is to be increased under a condition that the accelerator-off operation period is equal to or less than a predetermined period. However, in a case where the travel mode is designated to the sport mode, the determination processor 2c may refrain from determining that a timing at which the regenerative braking force is to be increased under the sole condition that the accelerator-off operation period is equal to or less than the predetermined period. Note that the term "accelerator-off operation period" may denote a necessary period for an operation that the driver having been depressing the accelerator pedal releases the accelerator pedal to lower an accelerator position.

In a specific but non-limiting example, during traveling in the normal mode, the determination processor 2c may determine a timing at which a regenerative braking force is to be increased under a condition that an accelerator-off operation period in which the accelerator position shifts from a value equal to or greater than a first threshold (X1 [%]) to a value equal to or less than a second threshold (X2 [%]) is equal to or less than a first predetermined period (th1).

In contrast, during traveling in the sport mode, the determination processor 2c may determine a timing at which a regenerative braking force is to be increased under a condition that the acceleration is equal to or higher a predetermined value (Y [m/s$^2$]) and that an accelerator-off operation period in which the accelerator position shifts from a value equal to or greater than a third threshold (X3 [%]) to a value equal to or less than a fourth threshold (X4 [%]) is equal to or less than a second predetermined period (th2).

As the determination processor 2c determines the timing at which the regenerative braking force is to be increased, the regeneration controller 2d may cause the motor controller 20 to increase a motor regenerative force. That is, the regeneration controller 2d may instruct the motor controller 20 to perform the regeneration temporary increase control.

The free run timer 2e may serve as a timer implemented as software or hardware in the hybrid control unit 2. In particular, the free run timer 2e may be used to determine an accelerator-off operation period.

In accordance with the determination by the determination processor 2c, the free run timer 2e may reset a count value and start counting anew.

The settings storage 2f may read, store, and update various kinds of set values used for the regeneration temporary increase control. For example, in one example embodiment, the settings storage 2f may perform such a process that reads the first threshold X1, the second threshold X2, the third threshold X3, the fourth threshold X4, the first predetermined period th1, the second predetermined period th2, and the predetermined value Y for acceleration, from a non-volatile storage or a ROM, for example, or store them in the non-volatile storage or the ROM, for example. Hereinafter, the first threshold X1, the second threshold X2, the third threshold X3, and the fourth threshold X4 are respectively referred to as the "threshold X1", the "threshold X2", the "threshold X3", and the "threshold X4". Hereinafter, the first predetermined period th1 and the second predetermined period th2 are respectively referred to as the "predetermined period th1" and the "predetermined period th2". Hereinafter, the predetermined value Y for acceleration is simply referred to as the "predetermined value Y".

The settings storage 2f may further perform such a process that reads a set value indicative of a regenerative braking force used for the regeneration temporary increase control from the non-volatile storage or the ROM or stores them in the non-volatile storage or the ROM.

Regeneration Temporary Increase Process

Figure 3:
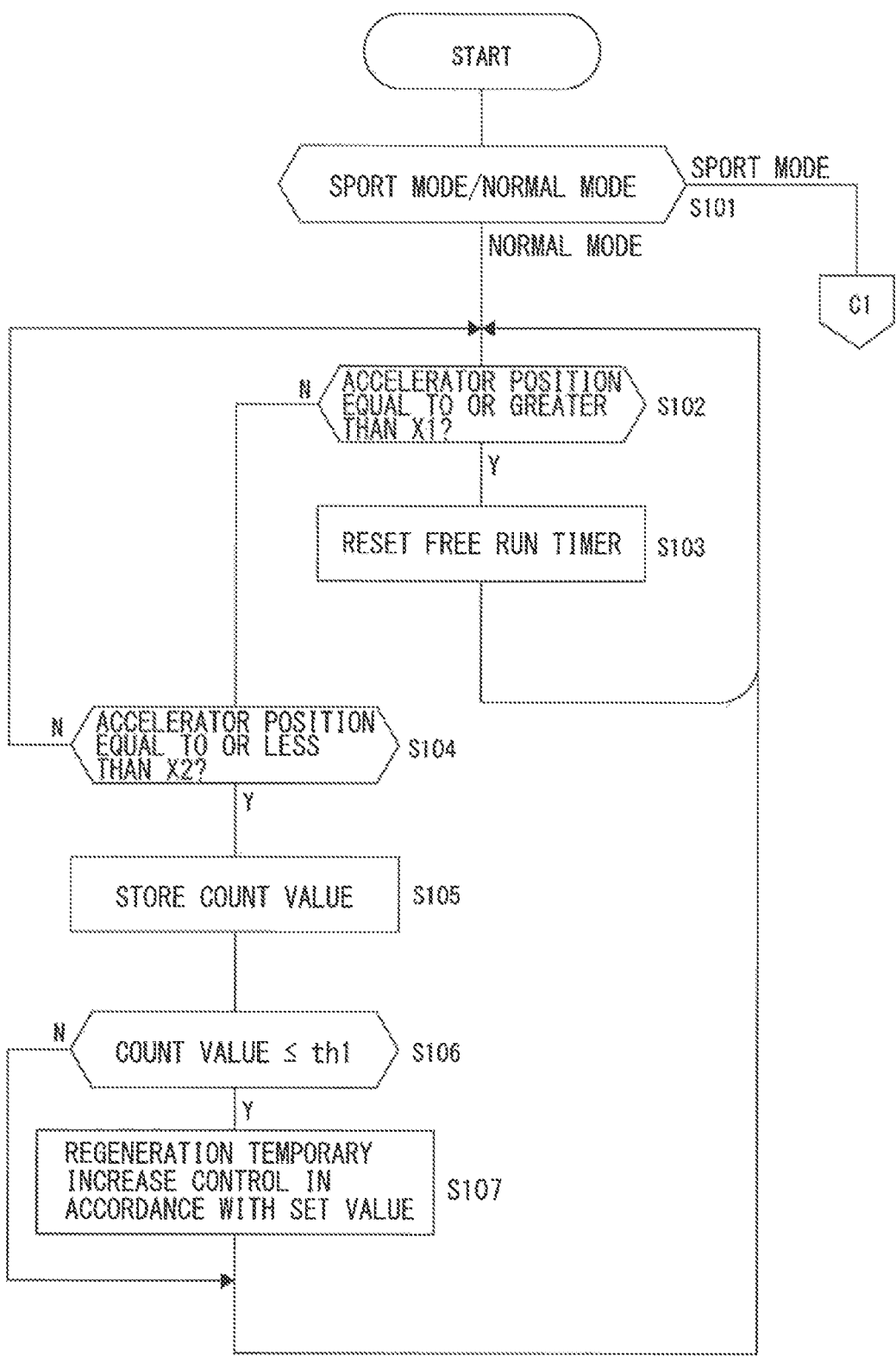
FIG. 3 is a flowchart illustrating an example process of a regeneration temporary increase control according to the example embodiment.
Figure 4:
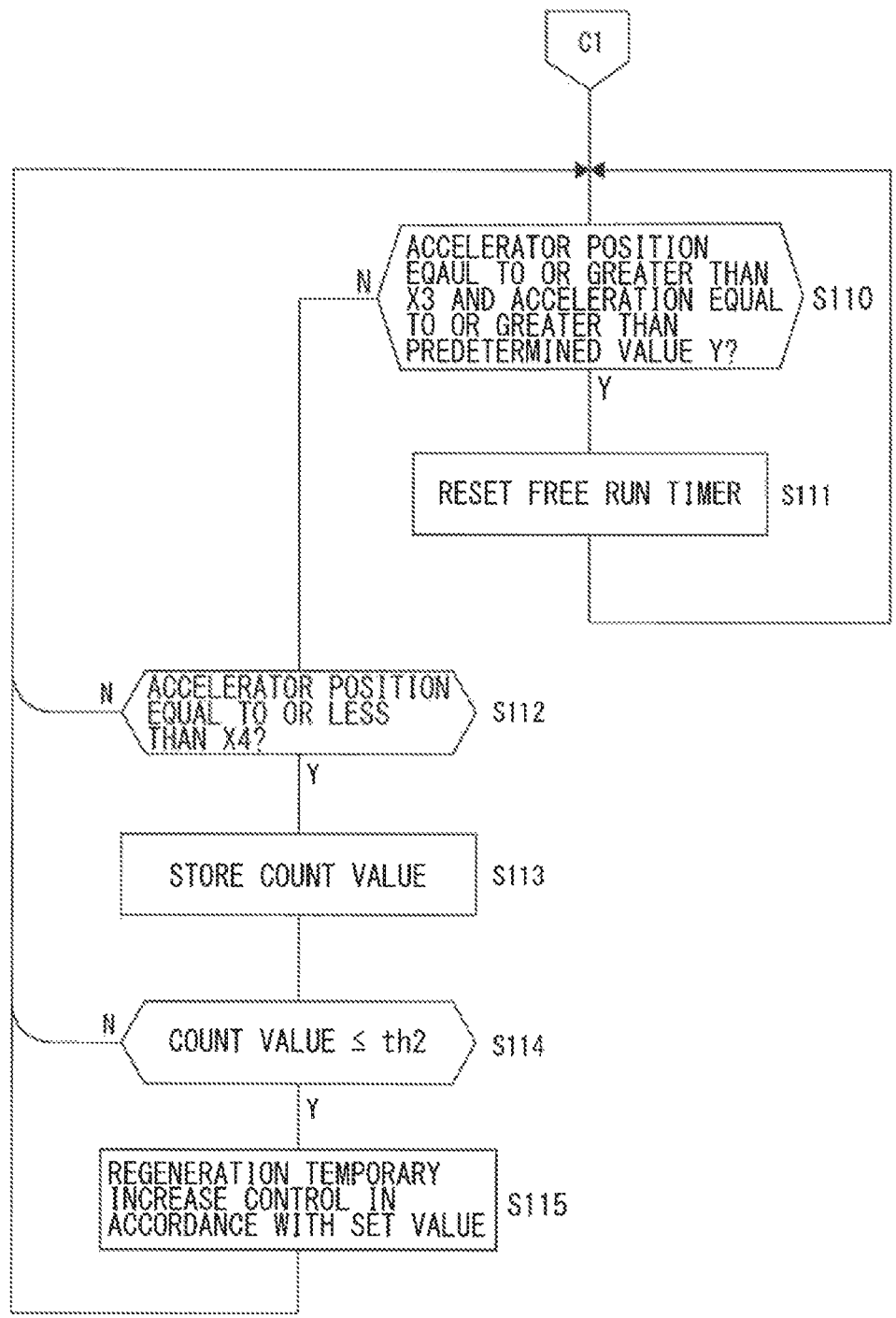
FIG. 4 is a flowchart illustrating the example process of the regeneration temporary increase control according to the example embodiment.

FIGS. 3 and 4 illustrate an example process of the regeneration temporary increase control performed by the hybrid control unit 2 including the components as described above.

Note that, as indicated by "C1", the process may continue from step S101 in FIG. 3 to step S110 in FIG. 4 in some cases. At least during traveling, the hybrid control unit 2 may continuously and repeatedly execute the process in FIGS. 3 and 4.

Although FIGS. 3 and 4 do not illustrate a particular timing when the process ends, the process may once end each time the vehicle stops, and may restart from step S101 when the vehicle sets off. Alternatively, that the process may be continuously executed while the system is turned on, and may end when the system is turned off. Still alternatively, the process may once end when a shift range is selected to a parking position. In any cases, the process may be executed while the vehicle is traveling.

At step S101 in FIG. 3, the hybrid control unit 2 may branch the process in accordance with a current travel mode. In a case of the normal mode, the process may proceed to step S102. In a case of the sport mode, the process may proceed to step S110 in FIG. 4.

A process during traveling in the normal mode will first be described.

At step S102, the hybrid control unit 2 may determine whether a current accelerator position is equal to or greater than the threshold X1. In one example embodiment, the threshold X1 may be a value of 80%, for example. That is, it is possible with the threshold X1 to determine whether the driver is performing an accelerator operation requiring relatively greater acceleration.

In a case where the current accelerator position is equal to or greater than the threshold X1 (step S102: Y), the process by the hybrid control unit 2 may proceed to step S103 in which the free run timer 2e may be reset. The process by the hybrid control unit 2 may then return to step S102.

The free run timer 2e may start counting an elapsed time at this timing.

Whenever the driver is depressing the accelerator pedal to an accelerator position equal to or greater than the threshold X1, the process by the hybrid control unit 2 may proceed to step S103, and the free run timer 2e may be repeatedly reset.

In a case where the current accelerator position is not equal to or greater than the threshold X1 (step S102: N), the process by the hybrid control unit 2 may proceed to step S104 to determine whether the current accelerator position is equal to or less than the threshold X2. In one example embodiment, the threshold X2 may be a value of 20%, for example. That is, it is possible with the threshold X3 to determine whether the driver has performed a normal accelerator-off operation.

When the accelerator-off operation that causes the accelerator position to be equal to or less than the threshold X2 is not determined despite of the releasing of the accelerator pedal (step S104: N), the process by the hybrid control unit 2 may return to step S102. While the accelerator position is kept in a range between 20% and 80% exclusive, for example, the free run timer 2e may keep counting its count value.

When it is detected at step S104 that the accelerator position is equal to or less than the threshold X2 (step S104: Y), the process by the hybrid control unit 2 may proceed to step S105 in which a count value of the free run timer 2e at this point of time may be temporarily stored in a work region of the RAM, for example.

The count value may correspond to an elapsed time from a state where an accelerator position is equal to or greater than the threshold X to a point of time when the accelerator position becomes equal to or less than the threshold X2.

The hybrid control unit 2 may determine at step S106 whether the count value temporarily stored corresponds to a period equal to or less than the predetermined period th1.

In a case where the count value temporarily stored does not correspond to a period equal to or less than the predetermined period th1 (step S106: N), the process by the hybrid control unit 2 may return to step S102. In contrast, in a case where the count value temporarily stored corresponds to a period equal to or less than the predetermined period th1 (step S106: Y), the hybrid control unit 2 may execute the regeneration temporary increase control in step S107 to temporarily provide a regenerative braking force in accordance with the set value. That is, the hybrid control unit 2 may instruct the motor controller 20 to allow a regenerative braking force, a value of which is stored as the set value, to occur at the moment of the accelerator-off operation.

The process by the hybrid control unit 2 may return to step S102 to continue the process.

The above-described operations attained through the process in the normal mode will be described with reference to FIG. 5.

Figure 5:
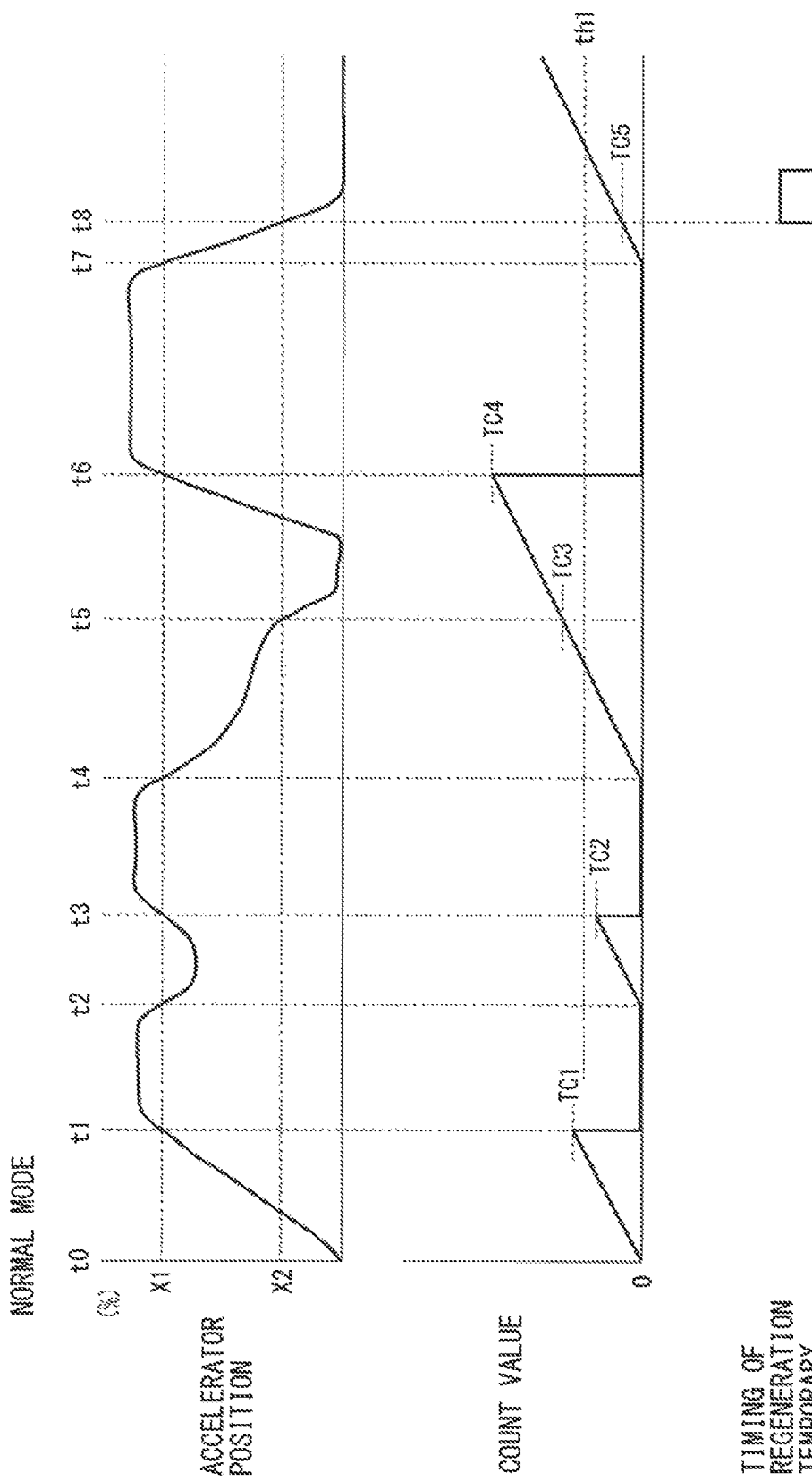
FIG. 5 illustrates an example of a regeneration temporary increase control in a normal mode according to the example embodiment.

With a horizontal axis serving as a time axis, FIG. 5 illustrates an example of changes in accelerator position, count values of the free run timer 2*e*, and a timing of the regeneration temporary increase control.

The driver may start depressing the accelerator pedal at a point of time t0. Accordingly, an accelerator position may reach the threshold X1 at a point of time t1.

Meanwhile, the free run timer 2*e* may keep counting to a count value TC1. At the point of time t1, the count value TC1 may be reset as the process proceeds to step S103.

Within a period between the point of time t1 and a point of time t2, such a state may continue where the accelerator position is equal to or greater than the threshold X1. The free run timer 2*e* may thus be kept reset.

When the driver slightly releases the accelerator pedal to an accelerator position lower than the threshold X1 at the point of time t2, the free run timer 2*e* may start counting to a count value TC2. Thereafter, the accelerator position may again become equal to or greater than the threshold X1 at a point of time t3, and the count value TC2 may be reset accordingly. It may be assumed that the driver has no intention to perform braking within a period between the point of time t2 and the point of time t3. No regeneration temporary increase control may therefore take place despite of the release of the accelerator.

Within a period between the point of time t3 to a point of time t4, the driver may depress the accelerator pedal again, so that the accelerator position may be kept equal to or greater than the threshold X1. The free run timer 2*e* may thus be kept reset.

Thereafter, the driver may release the accelerator pedal to the accelerator position less than the threshold X1 at the point of time t4. After that, the accelerator position may become equal to or less than the threshold X2 at a point of time t5.

In the point of time t5, a count value TC3 may be temporarily stored at step S105 of the process. Thereafter, at step S106, the count value TC3 may be compared with the predetermined period th1.

In this example illustrated in FIG. 5, the count value TC3 may be greater than the predetermined period th1. No regeneration temporary increase control therefore takes place. This may correspond to a case where the driver has performed an accelerator-off operation relatively slowly. It therefore may be assumed that the driver has no intention to make a sudden stop. An unnecessary regeneration temporary increase control will not take place accordingly.

Note that normal regenerative braking or engine braking in accordance with the accelerator-off operation may be executed through a separate process. The term "regeneration temporary increase control" may denote such a control that causes a braking force greater than a normal regenerative braking force to occur.

Thereafter, the driver may depress the accelerator pedal.

As the free run timer 2*e* may have kept counting, the count value may reach a count value TC4 at a point of time t6, for example. The count value may be reset at the point of time t6 when the accelerator position becomes equal to or greater than the threshold X1. The free run timer 2*e* may be kept reset from the point of time t6 to a point of time t7 in which the accelerator position is equal to or greater than the threshold X1.

The accelerator position may become less than the threshold X1 at the point of time t7 due to a quick accelerator-off operation by the driver, and the accelerator position may then become equal to or less than the threshold X2 at a point of time t8.

Meanwhile, the free run timer 2*e* may be repeatedly reset from the point of time t6 to the point of time t7. A count value TC5 indicative of an elapsed time from the point of time t7 to the point of time t8 may be temporarily stored at step S105 of the process. Thereafter, at step S106, the count value TC5 may be compared with the predetermined period th1.

In this example illustrated in FIG. 5, the count value TC5 may be equal to or less than the predetermined period th1. As illustrated in FIGS. 3 and 5, the regeneration temporary increase control may therefore take place at the point of time t8 when the accelerator-off operation is detected (S107).

This may correspond to a case where the driver has performed a prompt accelerator-off operation. It therefore may be assumed that the driver has an intention to make a sudden stop. The regeneration temporary increase control may accordingly take place to increase a braking force at a point of time before the brake pedal is depressed.

FIGS. 6A and 6B illustrate different cases where the brake pedal is depressed after an accelerator-off operation. With a horizontal axis serving as a time axis, FIGS. 6A and 6B each illustrate an accelerator position, a brake depressing force, a request for regeneration from the brake control unit 6 to the hybrid control unit 2, and a regenerative force of the motor generator instructed by the hybrid control unit 2 to the motor controller 20.

FIG. 6A illustrates a case where no regeneration temporary increase control takes place, which may correspond to a period between the point of time t4 to the point of time t6 in FIG. 5, for example.

As illustrated in FIG. 6A, an accelerator-off operation may take place relatively slowly within a period from a point of time t20 to a point of time t21. The brake pedal may then be depressed at a point of time t22. In response to the brake pedal operation, a request for regeneration may be sent from the brake control unit 6 to the hybrid control unit 2 at the point of time t22.

In response to the request, the hybrid control unit 2 may instruct the motor controller 20 to provide a regenerative force at the point of time t22, causing the motor generator to exert a regenerative braking force.

That is, regenerative braking may take place in accordance with the brake pedal operation as illustrated in FIG. 6A.

Note that, at and after a point of time t23, a maximum regenerative braking force may be exerted as the brake pedal is depressed further stronger.

FIG. 6B illustrates a case where the regeneration temporary increase control takes place, which may correspond to a period between the point of time t7 to the point of time t8 in FIG. 5, for example.

As illustrated in FIG. 6B, an accelerator-off operation may promptly take place at a point of time t30. Thereafter, the brake pedal may be depressed at a point of time t31. In response to the brake pedal operation, a request for regeneration may be sent from the brake control unit 6 to the hybrid control unit 2 at the point of time t32.

Unlike the case in FIG. 6A, the hybrid control unit 2 may instruct the motor controller 20 to perform the regeneration temporary increase control to provide a regenerative force at a timing of the accelerator-off operation at the point of time t30, causing the motor generator to exert a regenerative braking force.

That is, regenerative braking may take place at a point of time before the brake pedal operation takes place as illustrated in FIG. 6B.

At and after the point of time t32, as the request for regeneration is actually received through the operation of the brake pedal, it may be instructed that a maximum regenerative braking force is exerted.

Next, a process during traveling in the sport mode will now be described.

In the sport mode, the process by the hybrid control unit 2 may proceed to step S110 in FIG. 4.

At step S110, the hybrid control unit 2 may determine whether a current accelerator position is equal to or greater than the threshold X3. The hybrid control unit 2 may further determine whether current acceleration is equal to or greater than the predetermined value Y.

In one example embodiment, the threshold X3 may be equal to or greater than the threshold X1. For example, the threshold X3 and the threshold X1 may be 80% (X3=X1=80%), or the threshold X3 may be 90%.

In any cases, the threshold X3 may be set to a value that allows the driver's accelerator operation requiring relatively greater acceleration to be determined.

In a case where the current accelerator position is equal to or greater than the threshold X3 and the current acceleration is equal to or greater than the predetermined value Y (step S110: Y), the process by the hybrid control unit 2 may proceed to step S111 in which the free run timer 2e may be reset. The process by the hybrid control unit 2 may then return to step S110.

In a case where the current accelerator position is not equal to or greater than the threshold X3, or the current acceleration is not equal to or greater than the predetermined value Y (step S110: N), the process by the hybrid control unit 2 may proceed to step S112 in which whether the current accelerator position is equal to or less than the threshold X4.

In one example embodiment, the threshold X4 may be equal to or less than the threshold X2. For example, the threshold X4 and the threshold X2 may be 20%, or the threshold X4 may be 10%.

In any cases, the threshold X4 may be set to a value that allows the driver's accelerator-off operation to be determined.

When the accelerator-off operation that causes the accelerator position to be equal to or less than the threshold X4 is not determined despite of the releasing of the accelerator pedal (step S112: N), the process by the hybrid control unit 2 may return to step S110. While the accelerator position is kept in a range between the threshold X4 (10%) and the threshold X3 (90%) exclusive, for example, the free run timer 2e may keep counting its count value.

When it is detected at step S112 that an accelerator position is equal to or less than the threshold X4 (step S112: Y), the process by the hybrid control unit 2 may proceed to step S113 in which a count value of the free run timer 2e at this point of time may be temporarily stored in the work region of the RAM, for example.

The count value may correspond to an elapsed time from a state where an accelerator position is equal to or greater than the threshold X3 and acceleration is equal to or greater than the predetermined value Y to a point of time when the accelerator position becomes equal to or less than the threshold X4.

The hybrid control unit 2 may determine at step S114 whether the count value temporarily stored corresponds to a period equal to or less than the predetermined period th2.

Note that the predetermined period th2 may be identical to the predetermined period th1. Alternatively, the predetermined period th2 may be less than the predetermined period th1 (i.e., th2<th1) for determining a shorter accelerator-off period.

When the count value temporarily stored does not correspond to a period equal to or less than the predetermined period th2 (step S114: N), the process by the hybrid control unit 2 may return to step S110. In contrast, when the count value temporarily stored corresponds to a period equal to or less than the predetermined period th2 (step S114: Y), the hybrid control unit 2 may execute the regeneration temporary increase control in step S115 to temporarily provide a regenerative braking force in accordance with the set value. That is, the hybrid control unit 2 may instruct the motor controller 20 to allow a regenerative braking force, a value of which is stored as the set value, to occur at the moment of the accelerator-off operation.

The process by the hybrid control unit 2 may return to step S110 to continue the process.

Note that, the value set for a regenerative braking force in the regeneration temporary increase control at step S107 in the normal mode may be identical to that at step S115 in the sport mode. Alternatively, the set value in the sport mode may cause a stronger braking force than that in the normal mode.

The above-described operations attained through the process in the sport mode will be described with reference to FIG. 7.

Figure 7:
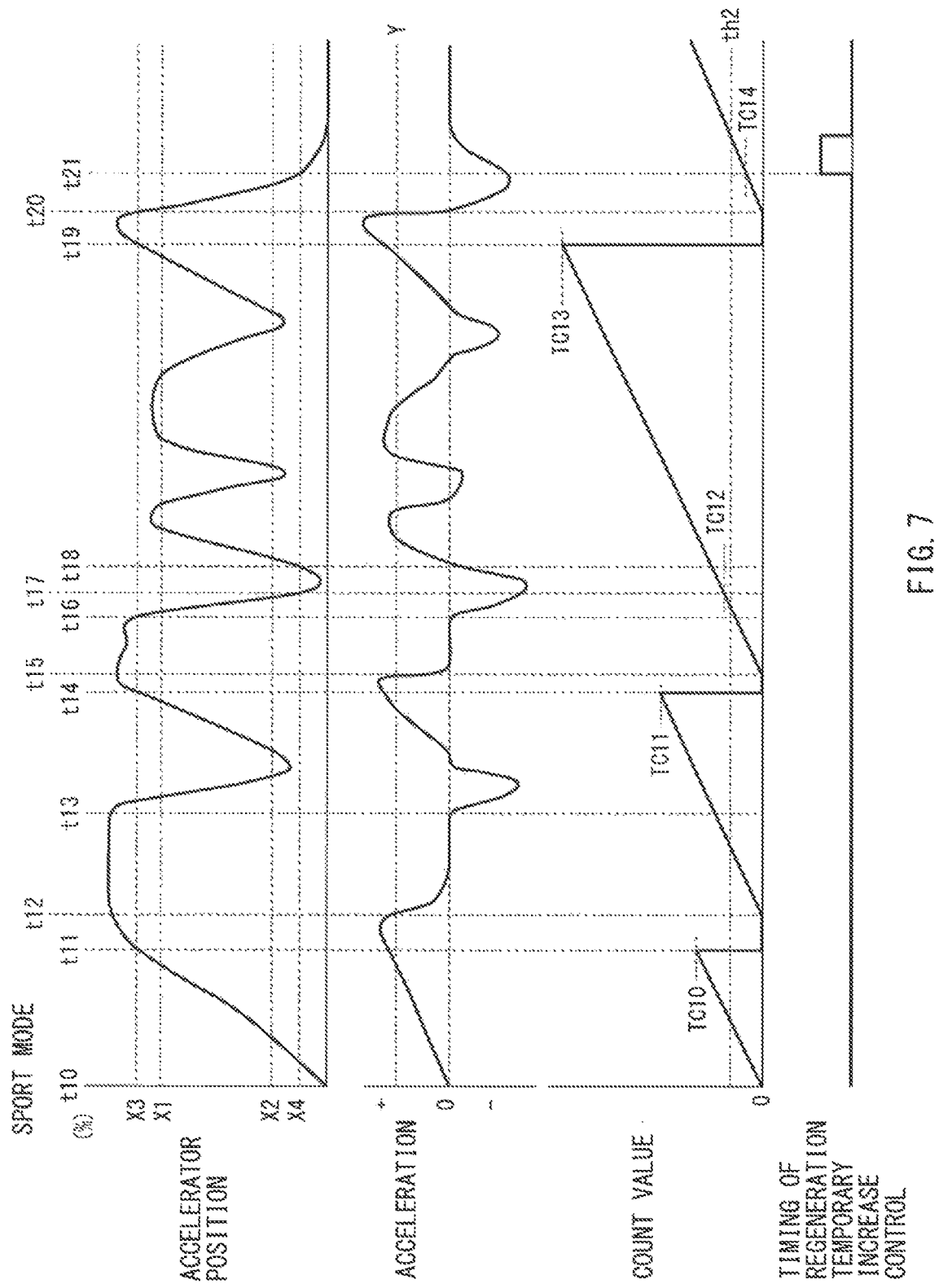
FIG. 7 illustrates an example of the regeneration temporary increase control in a sport mode according to the example embodiment.

With a horizontal axis serving as a time axis, FIG. 7 illustrates an example of changes in accelerator position and acceleration, count values of the free run timer 2e, and a timing of the regeneration temporary increase control.

The driver may start depressing the accelerator pedal at a point of time t10. Accordingly, an accelerator position may reach the threshold X3 at a point of time t11. Note that, in FIG. 7, the threshold X3 may be greater than the threshold X1 (X3>X1).

As the accelerator position rises, the acceleration may increase.

Meanwhile, the free run timer 2e may keep counting to a count value TC10. At the point of time t11, such a condition may be satisfied that the accelerator position is equal to or greater than the threshold X3 and that the acceleration is equal to or greater than the predetermined value Y. The process may therefore proceed to step S111 in which the free run timer 2e is reset accordingly. The condition may be kept satisfied until a point of time t12. The free run timer 2e may be kept reset accordingly.

At and after the point of time t12, the accelerator position may still be equal to or greater than the threshold X3, but the acceleration may be decreased. The free run timer 2e may start counting its count value without being reset.

At a point of time t13, the driver may make a prompt release of the accelerator pedal, such as a quick acceleration work, in the sport mode.

Within a period from the point of time t13 to a point of time t14, the accelerator position may be less than the threshold X3 and equal to or greater than the threshold X4. The process may therefore return from step S112 to S110, causing the free run timer 2e to keep counting to a count value TC11. At the point of time t14, the accelerator position may again become equal to or greater than the threshold X3, and the acceleration may become equal to or greater than the predetermined value Y accordingly. The free run timer 2e may thus be reset. This condition may be kept until a point of time t15.

At a point of time t16, the driver may again perform a prompt accelerator-off operation through a quick acceleration work. Within a period from a point of time t17 to a point of time t18, the accelerator position may become equal to or less than the threshold X4.

The process may accordingly proceed to step S113 in which a count value TC12 may be temporarily stored. In this example illustrated in FIG. 7, the free run timer 2e may have not been reset after the point of time t15. The count value TC12 may thus become greater than the predetermined period th2 regardless of the prompt accelerator-off operation. The process may thus not proceed from step S114 to S115. In other words, no regeneration temporary increase control may take place.

Within a period from the point of time t18 to a point of time t19, the driver may increase and decrease the accelerator position. The accelerator position may however still be in a range equal to or greater than the threshold X4 and less than the threshold X3. Additionally, the acceleration may be equal to or less than the predetermined value Y. The both conditions at steps S110 and S112 may thus not be satisfied. The free run timer 2e may keep counting a count value to a count value TC13 until the point of time t19 without being reset.

Note that, setting the threshold X3 to be greater than the threshold X1 and the threshold X4 to be less than the threshold X2 may allow the period from the point of time t18 to the point of time t19 to easily occur despite of a prompt acceleration work. Such setting may be appropriate for the sport mode.

Thereafter, the accelerator position may become equal to or greater than the threshold X3, and the acceleration may become equal to or greater than the predetermined value Y at the point of time t19, for example. At the point of time t19, the free run timer 2e may be reset accordingly.

Thereafter, the driver may perform an accelerator-off operation, so that the accelerator position may become less than the threshold X3 at a point of time t20. The accelerator position may then become equal to or less than the threshold X4 at a point of time t21.

Meanwhile, the free run timer 2e may be repeatedly reset from the point of time t10 to the point of time t20. A count value TC14 indicative of an elapsed time from the point of time t20 to the point of time t21 may be temporarily stored at step S113 of the process. Thereafter, at step S114, the count value TC14 may be compared with the predetermined period th2.

In this example illustrated in FIG. 7, the count value TC14 may be equal to or less than the predetermined period th2. As illustrated in FIGS. 4 and 7, the regeneration temporary increase control may therefore take place at the point of time t21 when the accelerator-off operation is detected (S115).

This may correspond to a case where the driver has performed a prompt accelerator-off operation during acceleration. It therefore may be assumed that the driver has an intention to make a sudden stop. The regeneration temporary increase control may accordingly take place to increase a braking force at a point of time before the brake pedal is depressed.

Thereafter, the driver may depress the brake pedal. In this case, the regeneration temporary increase control may cause strong braking to take place at the point of time before the brake pedal is depressed, as illustrated in FIG. 6B.

As described above, the regeneration temporary increase control may take place in a case where a prompt accelerator-off operation is detected during a high acceleration state in the sport mode.

Note that, although not illustrated in FIG. 7, in a case where the driver slowly releases the accelerator pedal, a count value may become greater than the predetermined period th2 at step S114. No regeneration temporary increase control therefore takes place. This may be similar to the case of the normal mode.

The regeneration temporary increase control may take place in both of the normal mode and the sport mode in Example 1 of FIG. 6B. Another example where the regeneration temporary increase control takes place may be conceivable as in Example 2 illustrated in FIG. 6C.

In Example 2, a regenerative braking force may be increased in a stepwise manner before and after the depression of the brake pedal. Alternatively, the regenerative braking force in the regeneration temporary increase control may be a slightly smaller than the regenerative braking force generated when the brake pedal is fully depressed, to allow braking to take place at an earlier timing. This improves braking performance while reducing a feeling of deceleration of the driver before a braking operation.

Conclusion and Modification Examples

According to at least one of the foregoing example embodiments described above, it is possible to provide effects described below.

In at least one of the foregoing example embodiments of the technology, appropriate brake control takes place in accordance with first and second travel modes. In the first travel mode, for example, stopping may be prioritized by increasing a regenerative braking force in response to a prompt accelerator-off operation. In the second travel mode where quick accelerator operations are expected to take place, a regenerative braking force is not increased solely in response to the prompt accelerator-off operation. This prevents drivability from being impaired. For example, the following effects may be obtained.

The hybrid control unit 2 described as the vehicle control apparatus according to the example embodiment may include the accelerator position acquisition unit 2a, the determination processor 2c, and the regeneration controller 2d. The accelerator position acquisition unit 2a may acquire data on an accelerator position. As the determination processor 2c determines a timing at which a regenerative braking force is to be increased, the regeneration controller 2d performs control that increases a motor regenerative force. During traveling in the first travel mode or the normal mode, the determination processor 2c determines a timing at which a regenerative braking force is to be increased under a condition that an accelerator-off operation period is equal to or less than a predetermined period. During traveling in the second travel mode or the sport mode, the determination processor 2c refrains from determining a timing at which the regenerative braking force is to be increased under the sole condition that the accelerator-off operation period is equal to or less than the predetermined period. That is, a method for determining a timing at which the motor regenerative force is to be increased to generate a braking force differs depending on the travel mode.

In the normal mode, such control that increases a braking force is performed when the accelerator-off operation period is short. The control causes a braking force to increase at an earlier timing immediately before the brake pedal is depressed. This improves safety. That is, a period from the occurrence of a driver's intention to make a stop to the occurrence of a braking force may become shorter, which reduces a time or distance required for stopping the vehicle. This configuration makes it possible to more properly deal with emergency stopping.

In contrast, in the sport mode where quick acceleration works are expected to be frequently performed, a braking force increased each time the accelerator pedal is promptly released can make the driver feel uncomfortable. Therefore, the regenerative braking force may be refrained from being increased under the same condition as that in the normal mode. This makes it possible to prevent the driver from feeling degraded drivability. There can be a circumstance where a driver who intends to drive the vehicle speedy may intentionally perform quick accelerator operations. Considering such a circumstance, the control of a braking force based on regeneration may be determined on the basis of not only the accelerator operation but also the travel mode. This makes it possible to distinguish an accelerator operation for danger avoidance from a quick accelerator operation.

According to at least one of the foregoing example embodiments of the technology, the hybrid control unit 2 may include the acceleration acquisition unit 2b that acquires data on acceleration in addition to the accelerator position acquisition unit 2a. During traveling in the normal mode, the determination processor 2c determines a timing at which a regenerative braking force is to be increased under the condition that an accelerator-off operation period in which an accelerator position shifts from a value equal to or greater than the threshold X1 to a value equal to or less than the threshold X2 is equal to or less than the predetermined period th1. During traveling in the sport mode, the determination processor 2c determines a timing at which the regenerative braking force is to be increased under the condition that acceleration is equal to or greater than the predetermined value Y and that the accelerator-off operation period in which an accelerator position shifts from a value equal to or greater than the threshold X3 to a value equal to or less than the threshold X4 is equal to or less than the predetermined period th2.

That is, during traveling in the sport mode, a timing at which the motor regenerative force is to be increased is determined on the basis of not only the condition of the accelerator-off operation period, but also the condition of acceleration.

In the normal mode, whether the driver is releasing the accelerator slowly or promptly may be first detected. When the driver is releasing the accelerator promptly, it may be assumed that the driver intends to perform braking. Such control that increases a braking force may thus take place.

In general, in a case where the driver intends to perform braking while depressing the accelerator (i.e., while the vehicle is accelerated more or less), the driver may release the accelerator pedal promptly, and may then depress the brake pedal. In this case, a braking force based on motor regeneration may be increased upon detection of the prompt releasing of the accelerator pedal. This allows a greater braking force to be generated at the moment when the accelerator pedal is released (i.e., before depression of the brake pedal), leading to an effective brake control for emergency stopping, for example.

The response of a braking force based on motor regeneration is higher than the response of a braking force based on brake pads. Therefore, performing control that increases a motor regenerative force is appropriate for making sudden braking in response to the prompt release of the accelerator.

As described above, it is possible to allow strong braking to occur before the driver operates the brake pedal. This makes it possible to improve safety in driving the vehicle in the normal mode.

In the sport mode, on the other hand, the hybrid control unit 2 may not only detect whether the driver is releasing the accelerator pedal slowly or promptly, but also determine acceleration. In a case where the driver promptly releases the accelerator pedal during relatively greater acceleration, it may be assumed that the driver intends to perform braking, allowing control of increasing a braking force to take place.

Quick accelerator operations may be expected to take place in the sport mode to be selected in a case where the driver prioritizes drivability. In the sport mode, prompt depression of the accelerator and a prompt accelerator-off operation may take place even when the driver does not have an intention to stop. If strong braking takes place just upon the prompt releasing of the accelerator as in the normal mode, unintentional deceleration may occur, which can make the driver feel uncomfortable with degraded drivability. In general, when the accelerator pedal is depressed while a vehicle speed is low, acceleration may become greater. When the vehicle speed is high, however, acceleration may not become so greater even when the accelerator pedal is depressed fully or almost fully. To acquire greater acceleration while the vehicle speed is high, the driver may depress the accelerator pedal, and then immediately release the accelerator pedal. The driver may often such an accelerator-off operation without an intention to perform braking.

According to at least one of the foregoing example embodiments of the technology, a timing when the driver intends to perform braking may be determined excluding such cases as described above. That is, when a sudden accelerator-off operation takes place after prompt acceleration, it may be assumed that the driver intends to perform sudden braking. In this case, a braking force may be increased on the basis of motor regeneration accordingly.

For example, to abruptly cease prompt acceleration through the accelerator-on operation, the driver may often depress the brake pedal to perform braking immediately after the prompt acceleration. In such a case as described above, allowing sudden braking to take place may often conform to an intention of the driver. As in a case of the normal mode, it is possible to allow braking to take place with higher response through the regeneration temporary increase control. Braking in a state of relatively greater acceleration would be less likely to make the driver who has no intention to perform braking feel uncomfortable. That is, even when the regeneration temporary increase control takes place, the driver may not feel degraded drivability.

In the sport mode, it is therefore possible to perform highly responsive braking preventing the driver from feeling degraded drivability. This also improves safety.

Note that, even in either of the normal mode and the sport mode, the process as described with reference to FIGS. 3 and 4 makes it possible to reduce the occurrence of braking based on regenerative braking when the driver has no intention to perform braking. This is based on the premise that a normal regenerative braking force or an engine braking force occurs through accelerator-off operation even when no regeneration temporary increase control takes place. The braking performance therefore may be prevented from lowering even when no regeneration temporary increase control takes place. That is, the safety attained through the process according to the example embodiment is not inferior to the safety attained through conventional vehicle control systems.

In the example embodiment, the normal mode and the sport mode are described as examples of the travel mode. The sport mode represents a travel mode where acceleration response with respect to an accelerator position is higher than acceleration response in the normal mode.

With the process in FIG. 4, as described above, it is possible to perform appropriate braking based on a regenerative force with higher response in a travel mode, such as the sport mode, where prompt acceleration works are expected to take place.

In at least one of the foregoing example embodiments, the threshold X3 may be a value corresponding to an accelerator position equal to or greater than the threshold X1. For example, in a case where the threshold X1 to be compared with an accelerator position in the normal mode is set to 80%, the threshold X3 to be compared with an accelerator position in the sport mode may also be set to 80%, or to a higher value of 90%, for example.

In at least one of the foregoing example embodiments, the thresholds X1 and X3 may be common between the normal mode and the sport mode to determine a high accelerator position for a determination of the regeneration temporary increase control. In another example embodiment, the threshold X3 may be higher than the threshold X1 to appropriately determine a timing of the regeneration temporary increase control in the sport mode where prompt acceleration works are expected to be performed. In this case, the regeneration temporary increase control would less likely to be determined to take place within a period from the point of time t18 to the point of time t19 in FIG. 7. This prevents the driver from feeling uncomfortable.

In the normal mode, on the other hand, the threshold X1 may be set to a lower value. This makes it possible to easily allow the regeneration temporary increase to take place.

Note that the thresholds X1 and X3 may be rewritable. In one example embodiment, the values may be adjusted to satisfy user's driving preference, for example.

In at least one of the foregoing example embodiments, the threshold X4 may be a value corresponding to an accelerator position equal to or less than the threshold X2. For example, in a case where the threshold X2 to be compared with an accelerator position in the normal mode is set to 20%, the threshold X4 to be compared with an accelerator position in the sport mode may also be set to 20%, or to a lower value of 10%, for example.

In at least one of the foregoing example embodiments, the thresholds X2 and X4 may be common between the normal mode and the sport mode to determine a low accelerator position for a determination of the regeneration temporary increase control. In another example embodiment, the threshold X4 may be lower than the threshold X2 in the sport mode where prompt acceleration works are expected to be performed. In this case, the regeneration temporary increase control would be less likely to be determined to take place within a period from the point of time t18 to the point of time t19 in FIG. 7. Accordingly, it is possible to properly distinguish a prompt release of the accelerator without an intention to perform braking form a prompt release of the accelerator with an intention to perform braking. This facilitates execution of the regeneration temporary increase control at an appropriate timing.

In the normal mode, on the other hand, the second threshold X2 may be set to a higher value. This makes it possible to easily allow the regeneration temporary increase to take place.

Note that the thresholds X2 and X4 may be rewritable. In one example embodiment, the values may be adjusted to satisfy user's driving preference, for example.

The configuration examples and the process examples according to the example embodiment are merely examples. Appropriate modification examples are still conceivable.

In at least one of the foregoing example embodiment, it may be verified whether acceleration immediately before an accelerator-off operation is equal to or greater than the predetermined value Y in the sport mode. In another example embodiment, whether there is an intention to perform braking may be further precisely estimated on the basis of an analysis of a change in acceleration, and the estimation may be reflected to the regeneration temporary increase control, for example.

In still another example embodiment, a timing of the regeneration temporary increase control may be determined upon satisfaction of a condition that an accelerator-off operation period is equal to or less than a predetermined period and a condition relevant to a parameter other than acceleration, in the sport mode.

The determination processor 2c and the regeneration controller 2d in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the determination processor 2c and the regeneration controller 2d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the determination processor 2c and the regeneration controller 2d in FIG. 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus for a vehicle, the vehicle control apparatus comprising:
a determination processor configured to:
when the vehicle is traveling in a first travel mode, determine a timing at which a regenerative braking force is to be increased based on determining that a first accelerator-off operation period is equal to or less than a predetermined period, the first accelerator-off operation period being a period of time that elapses for a position of an accelerator of the vehicle to shift from a first position to a second position during release of the accelerator, a depressed amount of the accelerator corresponding to the first position being greater than a depressed amount of the accelerator corresponding to the second position; and
when the vehicle is traveling in a second travel mode, determine the timing at which the regenerative braking force is to be increased based on determining that i) a second accelerator-off operation period is equal to or less than the predetermined period, the second accelerator-off operation period being a period of time that elapses for the position of an accelerator of the vehicle to shift from a third position to a fourth position during release of the accelerator, a depressed amount of the accelerator corresponding to the third position being greater than a depressed amount of the accelerator corresponding to the fourth position, and ii) acceleration of the vehicle at a beginning of the second accelerator-off operation period when the accelerator is at the third position is equal to or greater than a predetermined value; and
a regeneration controller configured to perform control to increase a motor regenerative force at the determined timing at which the regenerative braking force is to be increased.

2. The vehicle control apparatus according to claim 1, further comprising:
an accelerator position acquisition unit configured to acquire data on the position of the accelerator; and
an acceleration acquisition unit configured to acquire data on the acceleration,
wherein the depressed amount of the accelerator corresponding to the first position is equal to or greater than a first threshold,
wherein the depressed amount of the accelerator corresponding to the second position is equal to or less than a second threshold,
wherein the depressed amount of the accelerator corresponding to the third position is equal to or greater than a third threshold, and
wherein the depressed amount of the accelerator corresponding to the fourth position is equal to or less than a fourth threshold.

3. The vehicle control apparatus according to claim 1, wherein an acceleration response of the vehicle in the second travel mode with respect to change in the accelerator position is higher than an acceleration response of the vehicle in the first travel mode with respect to change in the accelerator position.

4. The vehicle control apparatus according to claim 2, wherein a depressed amount of the accelerator corresponding to the fourth threshold is less than a depressed amount of the accelerator corresponding to the second threshold.

5. The vehicle control apparatus according to claim 2, wherein, in the second travel mode, an acceleration response is higher than an acceleration response in the first travel mode.

6. The vehicle control apparatus according to claim 5, wherein a depressed amount of the accelerator corresponding to the third threshold is greater than a depressed amount of the accelerator corresponding to the first threshold.

7. The vehicle control apparatus according to claim 6, wherein a depressed amount of the accelerator corresponding to the fourth threshold is less than a depressed amount of the accelerator corresponding to the second threshold.

8. The vehicle control apparatus according to claim 5, wherein a depressed amount of the accelerator corresponding to the fourth threshold is less than a depressed amount of the accelerator corresponding to the second threshold.

9. The vehicle control apparatus according to claim 2, wherein a depressed amount of the accelerator corresponding to the third threshold is greater than a depressed amount of the accelerator corresponding to the first threshold.

10. The vehicle control apparatus according to claim 9, wherein a depressed amount of the accelerator corresponding to the fourth threshold is less than a depressed amount of the accelerator corresponding to the second threshold.

11. A vehicle control apparatus comprising:
circuitry configured to:
when a vehicle is traveling in a first travel mode, determine a timing at which a regenerative braking force is to be increased based on determining that a first accelerator-off operation period is equal to or less than a predetermined period, the first accelerator-off operation period being a period of time that elapses for a position of an accelerator of the vehicle to shift from a first position to a second position during release of the accelerator, a depressed amount of the accelerator corresponding to the first position being greater than a depressed amount of the accelerator corresponding to the second position;
when the vehicle is traveling in a second travel mode, determine the timing at which the regenerative braking force is to be increased based on determining that i) a second accelerator-off operation period is equal to or less than the predetermined period, the second accelerator-off operation period being a period of time that elapses for the position of an accelerator of the vehicle to shift from a third position to a fourth position during release of the accelerator, a depressed amount of the accelerator corresponding to the third position being greater than a depressed amount of the accelerator corresponding to the fourth position, and ii) acceleration of the vehicle at a beginning of the second accelerator-off operation period when the accelerator is at the third position is equal to or greater than a predetermined value; and
perform control to increase a motor regenerative force at the determined timing at which the regenerative braking force is to be increased.

12. A vehicle control apparatus for a vehicle, the vehicle control apparatus comprising:
an accelerator position acquisition unit configured to acquire data on an accelerator position;
an acceleration acquisition unit configured to acquire data on acceleration of the vehicle;
a motor controller configured to control one or more motors that generate a generative braking force;
a regeneration controller configured to:
calculate a request value of the regenerative braking force in response to lowering the accelerator position, wherein the request value of the regenerative braking force includes a value corresponding to a first force determined based on the lowering of the accelerator position; and
output the request value of the regenerative braking force or information according to the request value of the regenerative braking force to the motor controller so that the one or more motors generate the regenerative braking force in accordance with the request value of the regenerative braking force; and
a determination processor configured to:
detect a first point of time at which conditions that the acceleration is equal to or greater than a predetermined value and the accelerator position is equal to or greater than a first threshold are satisfied and then no longer satisfied;

detect, after the first point of time, a second point of time at which a condition that the accelerator position is equal to or less than a second threshold is satisfied, the second threshold being less than the first threshold; and determine, when a period from the first point of time to the second point of time is less than a first predetermined period, a first timing at which the regenerative braking force is to be increased, wherein the first timing is a period from the second point of time to a predetermined time after, and wherein the regeneration controller calculates, during the first timing, sum of the first force and a second force as the request value of the regenerative braking force, the second force being positive.

13. The vehicle control apparatus according to claim 12, wherein the determination processor detects whether the vehicle is traveling in a first travel mode or in a second travel mode, and perform the determination of the first timing only when the vehicle is traveling in the second travel mode, wherein the determination processor is further configured to:

detect a third point of time at which a condition that the accelerator position is equal to or greater than a third threshold is satisfied and then no longer satisfied, the third threshold being less than the first threshold;

detect, after the third point of time, a fourth point of time at which a condition that the accelerator position is equal to or less than a fourth threshold is satisfied, the fourth threshold being greater than the second threshold and less than the first threshold; and determine, when i) the vehicle is traveling in the first travel mode and ii) a period from the third point of time to the fourth point of time is less than a second predetermined period, a second timing at which the regenerative braking force is to be increased, wherein the second timing is a period from the fourth point of time to the predetermined time after, and wherein the regeneration controller calculates, during the second timing, a sum of the first force and third force as the request value of the regenerative braking force, the third force is positive.

14. The vehicle control apparatus according to claim 13, wherein the third force is less than the second force.

15. The vehicle control apparatus according to claim 14, wherein an acceleration response of the vehicle in the second travel mode with respect to change in the accelerator position is higher than an acceleration response of the vehicle in the first travel mode with respect to change in the accelerator position.

16. The vehicle control apparatus according to claim 13, wherein an acceleration response of the vehicle in the second travel mode with respect to change in the accelerator position is higher than an acceleration response of the vehicle in the first travel mode with respect to change in the accelerator position.

* * * * *